United States Patent [19]

Weasel, Jr. et al.

[11] 3,721,301
[45] March 20, 1973

[54] CONTROL SYSTEM FOR A MULTIPLE ROW CROP HARVESTING MACHINE

[75] Inventors: George E. Weasel, Jr., McClure; Harold W. Weimer, Toledo, both of Ohio

[73] Assignee: Tem-Cole, Inc., McClure, Ohio

[22] Filed: Sept. 21, 1970

[21] Appl. No.: 73,728

Related U.S. Application Data

[63] Continuation-in-part of Ser. No. 762,176, Sept. 16, 1968, Pat. No. 3,548,951.

[52] U.S. Cl.....................171/61, 56/7, 56/DIG. 15
[51] Int. Cl..............................................A01d 25/04
[58] Field of Search..56/DIG. 1, 10.6, 10.3, DIG. 15, 56/7

[56] References Cited

UNITED STATES PATENTS

| | | | |
|---|---|---|---|
| 3,616,626 | 11/1971 | Bramley et al. | 56/7 |
| 3,563,011 | 2/1971 | Bramley et al. | 56/7 |
| 3,196,599 | 7/1965 | Meiners et al. | 56/DIG. 15 |
| 3,548,951 | 12/1970 | Weasel et al. | 171/61 |

*Primary Examiner*—Antonio F. Guida
*Attorney*—Owen & Owen

[57] ABSTRACT

A control system for a harvesting machine for the simultaneous harvesting of a plurality of plurality spaced-apart rows of crops. The machine includes a plurality of separate harvesting mechanisms mechanically driven by a plurality of hydraulic fluid motors whose output torque is proportional to the pressure of the hydraulic fluid supplied thereto. A source of hydraulic fluid under a predetermined constant pressure is connected to the fluid motors by fluid supply and return lines to provide a closed hydraulic system with a pressure responsive bypass valve positioned in each of the supply lines and effective to bypass hydraulic fluid around the motors supplied by that line when the pressure on said valve exceeds said predetermined constant pressure. When one of said harvesting mechanism encounters a load, such as an obstruction, which exceeds the output torque of its associated motor, the consequent pressure increase in said fluid supply line will open a bypass valve to effectively stop said motors and their harvesting mechanisms controlled by that valve until said obstruction is removed. The machine may further include an improved remotely operable override means for opening said bypass valve.

6 Claims, 4 Drawing Figures

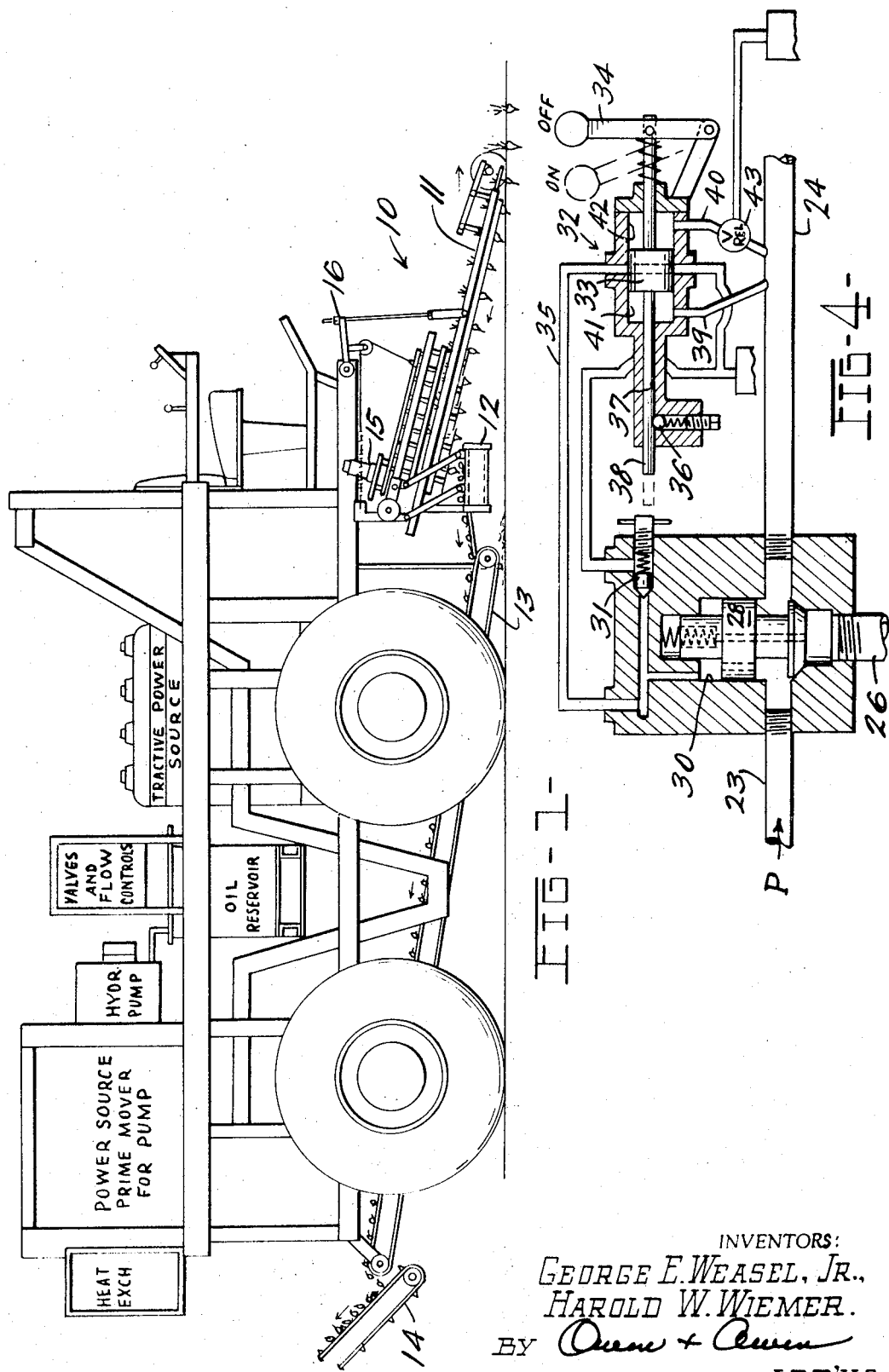

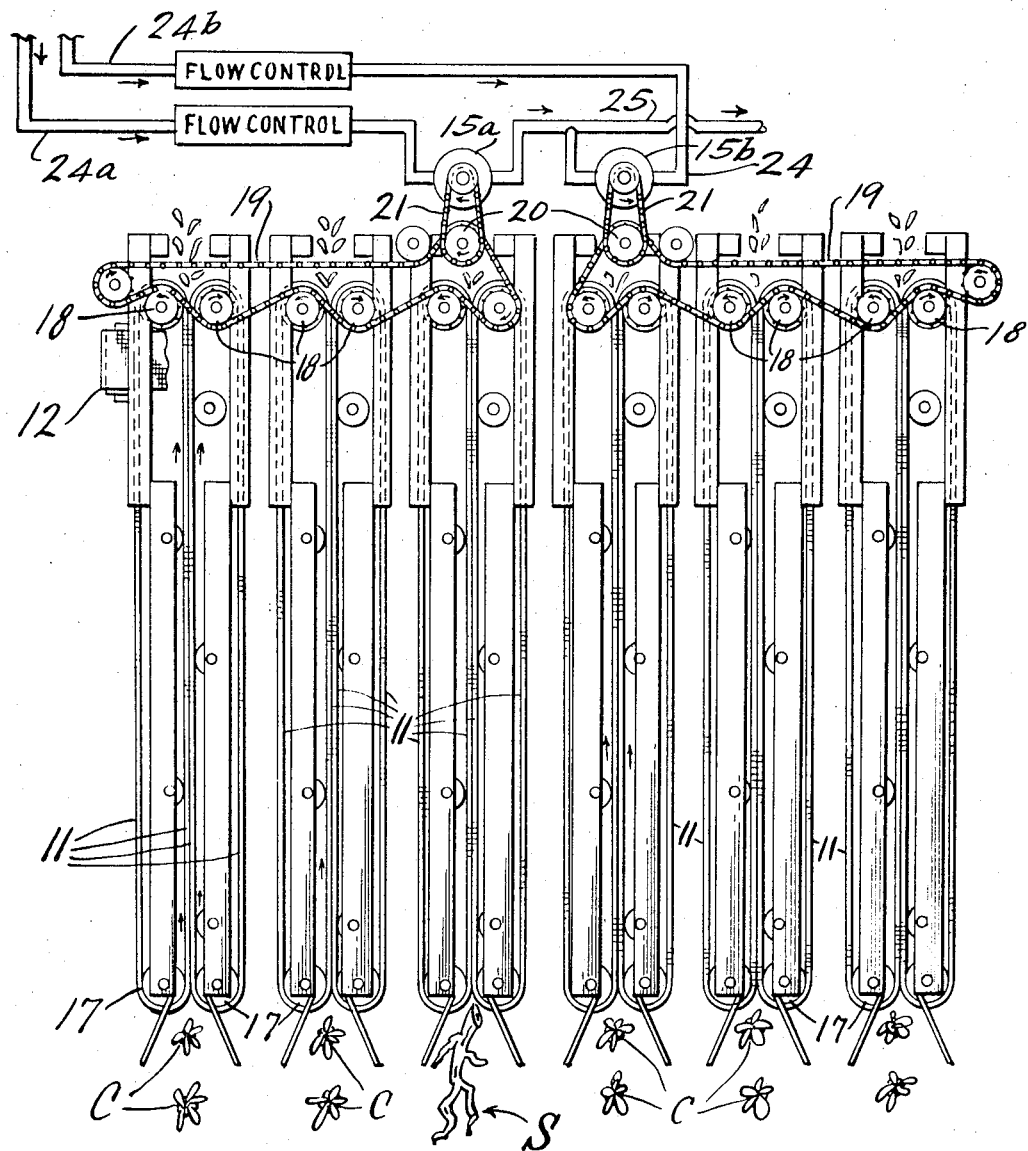
FIG-2-

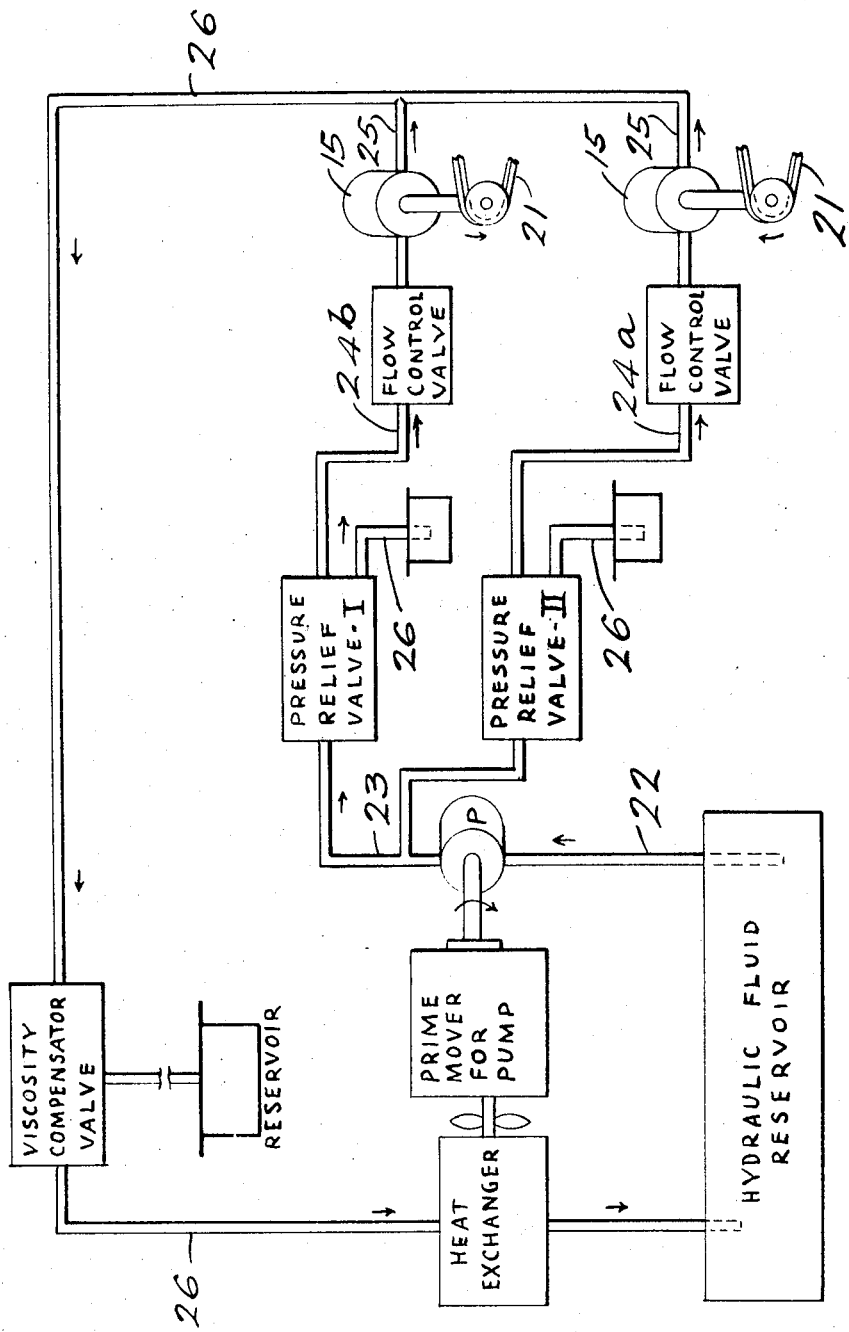

CONTROL SYSTEM FOR A MULTIPLE ROW CROP HARVESTING MACHINE

CROSS REFERENCE TO RELATED APPLICATION

This is a continuation-in-part of our co-pending application Ser. No. 762,176 filed Sept. 16, 1968, now U.S. Pat. No. 3,548,951 issued Dec. 22, 1970.

BACKGROUND OF THE INVENTION

This invention relates to a control system for a harvesting machine for use in the simultaneous harvesting of a plurality of rows of crops planted in parallel, spaced-apart rows. More particularly, the invention relates to a control system for a harvesting machine whose individual harvesting mechanisms are driven and controlled by a source of hydraulic power supplied to hydraulic motors mechanically connected to the harvesting mechanisms.

Root crop (beets, radishes, etc.) harvesting machines having a plurality of multiple harvesting units for serially harvesting crops planted in spaced-apart, parallel rows are known in the art and are generally complex machines for grasping the tops of the crops, lifting the crops out of the ground, and elevating the crops to a position over a conveyor mechanism, at which position a topping device severs the root crop from the top, thus causing the root to drop upon the conveyor which conveys it to a remote station where it is loaded in a hopper. Such machines, such as that disclosed in U.S. Pat. Nos. 2,476,336, 2,833,357 and 2,833,358, may include a pair of parallel endless belts extending from the harvest area at ground level upwardly to the front of the machine, with one outer surface of the belts being adjacent the other and driven from the harvesting area upwardly toward the front of the machine so that, as the machine moves forward along the rows of crops, the tops of the crops are gripped between the belts and pulled upwardly so that the root crop is separated from the earth. As the root crop progresses upwardly along the belts, it passes a severing mechanism which cuts the root crop from the top which is gripped by the belts, allowing the root crop to drop to the conveyor. The top of the crop, constituting unwanted leaves, continues past the conveyor and is dropped to the ground.

One of the difficulties encountered with such harvesting machines of the prior art is that frequently, when in operation, foreign objects, such as sticks, stones or other foreign material, are picked up by the harvesting mechanism and become wedged between the belts or lodged in the gears and associated parts used for driving the harvesting mechanisms. When this happens, either the drive linkage breaks, the mechanism becomes misaligned, or another malfunction occurs which causes that particular mechanism to become inoperative, thus requiring repair of the machine before subsequent harvesting can be done. In addition, alignment problems of the drive train are encountered, particularly due to the fact that the machines are preferably designed with an adjustable spacing between the harvesting mechanisms to accommodate varied row spacing so that the machines can be used with various crops, such as radishes, beets, etc., or with the same crop having variable spacing due to variable conditions in weather, soil, etc. Finally, machines having a mechanical drive from a power source to the harvesting mechanisms require frequent lubrication, cleaning and have extensive moving parts which should be covered to protect the operator against possible injury.

SUMMARY OF THE INVENTION

It is an object of the present invention to provide a multiple row harvesting machine and control system therefore capable of the simultaneous harvesting of a plurality of rows of planted crops, which eliminates the above-enumerated problems attendant with prior art machines, and which eliminates the down time due to machine breakdown caused by foreign objects in the field. The harvesting mechanisms included in the harvesting machine of this invention are mechanically driven by hydraulic motors located close to the mechanism itself and whose output torque is directly proportional to the pressure of the hydraulic fluid being supplied thereto. Each of the hydraulic motors which may drive one or several of the plurality of harvesting mechanisms is connected with a source of hydraulic fluid under a predetermined constant pressure by hydraulic supply and return lines which form a closed hydraulic system. Positioned in the hydraulic supply lines between the source of constant pressure and the fluid motors is a plurality of pressure responsive relief or bypass valves which are effective to bypass fluid around the hydraulic motors supplied by that particular line when the fluid pressure in that supply line exceeds the predetermined constant operating pressure. Thus, each of the hydraulic motors is driven with a predetermined output torque which is proportional to the predetermined supply pressure from the hydraulic fluid pressure source or pump. If one of the harvesting mechanisms, such as the parallel belts in the described examples, encounters a foreign object such as a large stick or stone which becomes wedged between the belts and presents a resistance greater than the output torque of its associated motor, the resultant increased fluid pressure will open the applicable bypass valve, thus bypassing fluid around the hydraulic motors supplied by that line, causing them to cease operation until the obstruction is removed. It will be thus apparent that such a system, if operated at a pressure so that the resulting output torque of the fluid motors is sufficient to drive the harvesting mechanisms under normal operation but insufficient to overcome obstructions which could cause damage to the parts, will effectively prevent such obstructions from causing misalignment or part breakage because the mechanism which is jammed or obstructed will merely stop operation until the obstruction is removed.

The basic system thus far described may be utilized in different ways. Firstly, a single bypass valve can be used in a common fluid supply line to control a plurality of hydraulic motors so that one malfunctioning harvesting mechanism will disable all of the other mechanisms. Secondly, each hydraulic motor may have its own bypass or relief valve so that malfunction of one will not disable the others. In the following example, two bypass valves are shown, each of which controls a single motor which drives several harvesting mechanisms. The selection of the number of mechanisms, motors and bypass valves to be used is dependant upon the type of harvesting machine, the conditions under which it is used, and the type of crop being harvested. Finally, because all connection between the source of hydraulic pressure and the harvesting mechanism motors are through hydraulic lines which may be flexible, the alignment lubrication and maintenance problems present in mechanically-driven machines of the prior art are entirely eliminated. Other objects and advantages of the instant invention will be apparent to those skilled in the art from the following detailed description of a preferred embodiment thereof.

BRIEF DESCRIPTION OF THE DRAWINGS

FIG. 1 is a schematic view in elevation of a complete harvesting machine of this invention, showing the belt-type harvesting mechanisms attached to the front end of a wheeled chassis which has its own source of tractive power and generally showing the layout of the various components making up the harvesting machine;

FIG. 2 is a plan view of the harvesting mechanism attached to the front end of the machine illustrated in FIG. 1, and showing two groups of three pairs of harvesting belts, each of the groups being driven by a separate hydraulic motor as desired;

FIG. 3 is a schematic diagram of the hydraulic drive and control system of this invention showing the two bypass valves which control the two hydraulic motors shown in FIG. 2; and FIG. 4 is a schematic detailed view of the pressure relief valve and its override actuator which is shown schematically in FIG. 3.

DETAILED DESCRIPTION OF A PREFERRED EMBODIMENT

Referring briefly to FIG. 1, the harvesting machine includes a wheeled chassis having a generally rectangular frame of a conventional nature upon which is mounted a tractive power source, such as a diesel engine, and the associated gears and controls for driving the machine over the ground. At the front end of the machine are mounted the plurality of harvesting mechanisms, generally designated by reference numeral 10 and which are shown in more detail in FIG. 2. Above the harvesting mechanisms 10 is a driver's control station which includes power and steering controls for the entire machine and remote controls for operating the harvesting mechanisms 10 and their power source.

The harvesting mechanisms 10 include a plurality of spaced-apart belts 11 which extend from the ground level in front of the machine upwardly to a position over a transverse conveyor 12 onto which the root bodies of the crops are dropped after they have been severed from the tops. The root bodies are then conveyed to the center of the machine where they are passed to a second conveyor 13 which extends beneath the machine and lengthwise under its chassis so that the crop roots are passed to the rear of the machine and thence on a third conveyor 14 which takes them to a remote position where they may be dumped in a separate hopper.

A hydraulic fluid pump driven by a separate power source, such as a second diesel engine, is mounted toward the rear of the chassis above a hydraulic fluid reservoir. The interconnecting fluid supply and return lines between the reservoir, pump and several fluid motors 15 which drive the harvesting mechanisms are carried on the chassis but are not shown in FIG. 1. As is the case with prior art machines, the harvesting mechanisms or belts 11 may be raised and lowered from an operating position adjacent the ground to an upper position by means of a lift mechanism 16, the details of which will be known to those skilled in the art and which do not form a part of this invention.

Referring to FIG. 2, each of the harvesting mechanisms 10 includes a pair of adjacent endless belts 11 which extend around lower guide wheels or pulleys 17 and upper guide wheels or pulleys 18. Three pairs of the belts 11 are driven by a driver chain 19 which extends around sprockets secured to the upper wheels 18 and an idler sprocket 20 which is, in turn, connected by a chain 21 to a chain sprocket secured to the shaft of a fluid motor 15a or 15b. Thus, it will be seen that as the fluid motors 15a and 15b turn in the direction of the small arrows shown in FIG. 2, the drive chains 19 turn the upper wheels 18 in the direction shown so that the belts 11 are driven in the direction of the arrows as indicated so that the adjacent edges between each pair of belts 11 move upwardly from the lower wheels 17 toward the upper wheels 18. As the machine moves along the rows of crops, the plants or crops, designated by reference numeral C, are engaged between the belts 11 and are serially passed upwardly to the upper part of the harvesting mechanism.

At the upper part of the harvesting mechanism, as is schematically shown in FIG. 1, a topping device similar to that shown in U.S. Pat. No. 2,476,336 is provided which gradually pulls the roots of the crops away from the belts as they pass toward the top of the mechanism and severs the roots from the tops, allowing the roots to drop into the transverse conveyor 12. The tops continue passing between the belts 11 to the end of their run and drop to the ground.

The hydraulic drive and control system for the harvesting mechanisms briefly described above is schematically illustrated in FIG. 3, which shows two fluid motors 15a and 15b and their hydraulic connections with the source of hydraulic pressure or pump P. As illustrated, the pump P is mechanically connected to a prime mover, such as a diesel engine, and is supplied with hydraulic fluid from a hydraulic reservoir through a line 22. The output of the pump is supplied to the motors 15a and 15b by a hydraulic supply line 23, through pressure relief valves I and II which include a selectively operated override switch which will be subsequently described in detail. Each of the branch supply lines 24a and 24b extending from the pressure relief valves I and II, respectively, are connected through a flow control valve to the hydraulic motors 15a and 15b. Hydraulic return lines 25 from each of the motors 15a and 15b connect to a common return line 26 which passes through a heat exchanger to the hydraulic fluid reservoir.

As previously pointed out, each of the hydraulic motors 15a and 15b has an output torque proportional to the pressure of the hydraulic fluid supplied thereto, and has an output speed proportional to the fluid flow rate (gallons per minute) through the motor. Each of the motors 15a and 15b is connected with a flow control valve which may be used to adjust the motor speed to the proper value so that the belts of the harvesting mechanisms are driven at precisely the same speed and at a speed desirable for harvesting the crops at a given ground speed for the entire harvesting machine along the rows. At a given predetermined output pressure from the pump P, each of the motors 15a and 15b with the flow control valves properly adjusted, will operate at the same speed and at a predetermined output torque sufficient to drive the harvesting mechanism under normal operation but insufficient to overcome obstacles in the mechanisms which might cause damage thereto. When such an obstacle is encountered, such as a large stick S shown in FIG. 2, pressure builds up in the supply lines 24a or 24b, causing the applicable pressure responsive bypass valve I or II to open and bypass fluid through the dump line 26, which effectively stops the motor 15a or 15b until the obstruction S is removed.

Finally, as shown schematically in FIG. 3, a heat exchanger for the hydraulic fluid is provided in the return line 26 along with a viscosity compensator, which may be a pressure relief valve, to bypass the heat exchanger when the oil is cold.

FIG. 4 is a detailed schematic view of a preferred embodiment of the pressure relief valve and its selectively operated override switch. The valve body 27 contains a spool valve 28 which is spring biased to its closed position where it shuts off flow to the return line 26 so that fluid flow goes directly from the pump and line 23 through line 24 to the hydraulic motors. The head of the spool valve 28 has a fluid passage 29 leading to an upper chamber 30 which has a manually set pressure vent 31. With the valve as thus far described, a sudden increase in fluid pressure in line 24, as caused by an obstruction, would raise the spool valve 28 to bypass fluid to the return line 26 until the return of normal pressure. The critical pressure is set by the vent 31 at, for example, 1000 psi. This would be considered the maximum permissable pressure in the system and would not be attained unless there were a failure in the override control about to be described.

The override control is schematically illustrated in FIG. 4 as comprising a fluid cylinder 32 containing a piston 33 movable by a lever 34 which, when in the vertical solid line position, places the internal passage of the piston 33 in line with a vent line 35 from the upper chamber 30 of the relief valve so that the spool valve 28 will rise to bypass fluid to line 26. Thus, in this position, the system is shut off. If the lever 34 is moved to the left, a detent ball 36 seats in a notch 37 in the extended shaft 38 from the piston 33 to hold the piston 33 and lever 34 in the left, on position. In this position, the system will operate as previously described so that it can be manually turned on or off by manipulation of the lever 34.

The override control includes an automatic shut-off feature effective to move the piston 33 and lever 34 to the off position when the pressure in the lines 23 and 24 exceeds a predetermined normal operating pressure which is lower than the pressure which will open the relief valve through the vent 31. Thus, the control has, in effect, two safety devices, the first which will shut off at say, 900 psi, and the second at 1000 psi. The second will be used only in case of failure of the first or in case the operator tries to override the first as will be described. The automatic shut-off of the handle 34 is provided by two pressure lines 39 and 40 which connect chambers 41 and 42, respectively on either side of the piston 33. A small pressure relief valve 43 in line 40 will limit the pressure in chamber 42 to the first shut-off pressure of 900 psi. Thus, if the line pressure in line 24 momentarily rises above 900 psi, the increased pressure in chamber 41 will move the piston 33 and handle 34 to the right, overcoming the detent 36, to shut off the system. If the operator manually moves the handle back, if the pressure has returned to normal, the system will operate. If not, the handle will "kick out" again. If the operator holds the handle closed and a major obstruction still exists, the main relief valve or second safety device will open through the vent 31. Thus the system provides manual control with two levels of safety override, the second level being effective to override the manual control. The system is thus foolproof in that an inexperienced operator cannot permanently damage the system by attempting to manually override the built in safety devices but can be quickly restored to normal operation if minor blockages cause pressure surges which actuate the first safety device to kick out the handle 34.

Hydraulic motors of the type described for use in this invention which have an output torque directly proportional to the pressure of the hydraulic fluid supplied thereto are available commercially from a number of sources including the Char-lynn Company of Eden Prairie, Minnesota 55345, whose fluid motors are described in U.S. Pat. No. Re25,291. Hydraulic pumps of the type required in this invention are also available from a number of sources including the Vickers Division of Sperry-Rand Corporation, Troy, Michigan 48084, whose "Series 50V" pumps are suitable for this purpose. Other individual components of the system are conventional and available from a number of commercial sources.

It is to be understood that the invention herein may be utilized in connection with many types of harvesting equipment in which a plurality of separate harvesting mechanisms are driven by a single motive source in which the simultaneous operation of such mechanisms remote from the power source is required. The advantages of remote control and of a control system responsive to obstructions which may be picked up in the harvesting apparatus are applicable to many types of machines and are not limited to the particular topping machine described. It is also to be understood that various modifications of the described apparatus may be made by those skilled in the art without departing from the scope and spirit of the attached claims.

We claim:

1. A power drive and control system for a harvesting machine having a plurality of harvesting mechanisms for the harvesting of rows of crops comprising, in combination,
   a plurality of hydraulic motors operably connected to said separate harvesting mechanisms whereby each motor will mechanically drive at least one such separate mechanism independently of the other such mechanisms, each of said hydraulic motors having an output torque directly proportional to the pressure of the hydraulic fluid supplied thereto,
   a source of hydraulic fluid under a predetermined constant pressure, hydraulic fluid supply and return lines interconnecting said constant pressure fluid source and said motors to provide a closed hydraulic system whereby all of said motors and the harvesting mechanisms associated therewith are driven under predetermined constant torque by fluid under said predetermined constant pressure from said source, and a plurality of pressure responsive bypass valves positioned in the hydraulic supply line upstream of each of said motors between said pressure source and each of said motors and adapted to bypass fluid around the motor downstream of the bypass valve when the pressure in the said supply line to that motor exceeds said predetermined constant pressure whereby, when any one of said harvesting mechanisms encounters a load exceeding such predetermined torque of its associated motor, the bypass valve upstream of that motor will open in response to increased pressure in its fluid supply line to effectively stop only such motor and its associated harvesting mechanisms.

2. A harvesting machine for the simultaneous harvesting of a plurality of parallel rows of crops comprising, in combination, a wheeled chassis with power means for driving and means for guiding said wheeled chassis along said parallel crop rows, a plurality of separate harvesting mechanisms secured to said chassis and positionable in close proximity to the ground for contact with said rows of crops, said harvesting mechanisms spaced apart a distance equal to the crop row spacing whereby each of said crop rows may be harvested by a separate harvesting mechanism, a plurality of hydraulic fluid motors mechanically connected to said harvesting mechanisms whereby each hydraulic motor drives at least one such separate harvesting mechanism, each of said hydraulic motors having an output torque directly proportional to the pressure of the hydraulic fluid supplied thereto, a source of hydraulic fluid under a predetermined constant pressure, hydraulic fluid supply and return lines inter-connecting said constant pressure source and said plurality of hydraulic motors to provide a closed hydraulic system whereby all of said motors and the harvesting mechanisms connected therewith are driven at a predetermined constant torque by hydraulic fluid under said predetermined constant pressure from said source, and a pressure responsive bypass valve positioned in the hydraulic supply line upstream of each of said motors between said constant pressure source and each of said hydraulic motors and adapted to bypass fluid around the motor downstream of the bypass valve when the pressure in the supply line to that motor exceeds said predetermined constant pressure whereby, when any one of said harvesting mechanisms encounters a load exceeding said predetermined torque of its associated motor, said bypass valve upstream of that motor will open in response to increased hydraulic fluid pressure in its fluid supply line to effectively stop only such motor and its associated harvesting mechanisms.

3. In a power control system for a harvesting machine having a plurality of harvesting mechanisms driven by a hydraulic motor having an output torque directly proportional to the pressure of hydraulic fluid supplied thereto, the improvement comprising a pressure responsive bypass and control valve positioned in the hydraulic supply line for said motor, said valve having a closed position at which hydraulic fluid passes through said valve to said motor and an open position at which hydraulic fluid is bypassed around said motor to effectively stop said motor and the harvesting mechanisms driven thereby, said valve being spring biased towards said closed position and having a pressure face exposed to hydraulic fluid pressure in said supply line whereby said valve will open against said spring bias when said pressure exceeds a first predetermined value, and a manual valve control means having a first condition at which said valve will open at said predetermined pressure and a second condition which causes said valve to open regardless of said supply line pressure, and means for automatically moving said manual control valve from its said first to its said second condition when said supply line pressure reaches a second predetermined value less than said first predetermined value.

4. The power control system of claim 3 wherein said manual valve control means and said means for automatically moving said valve comprises a fluid cylinder, a piston movable within said cylinder, a fluid passage through said cylinder and piston when said piston is in its open position, means on said piston for blocking said fluid passage when said piston is moved from said open position, means for applying fluid pressure from said supply lines to said piston, means for holding said piston in said open position, means for overcoming said holding means and effective to move said piston from its said open position when said fluid pressure exceeds a second predetermined level lower than said first predetermined pressure valve, and means actuated by movement of said piston away from its said open position effective to open said bypass valve.

5. A method of driving and controlling a plurality of mechanisms associated on a common chassis with each mechanism driven by a hydraulic fluid motor having a predetermined output torque directly proportional to the pressure of the hydraulic fluid supplied thereto, with fluid pressure being supplied through a hydraulic system having hydraulic fluid supply and return lines interconnecting each of said motors with a constant pressure source and a pressure responsive bypass valve in each of said supply lines, said method comprising the steps of (1) supplying hydraulic fluid under a predetermined pressure to each of said motors through said supply lines, (2) monitoring the pressure of said fluid in each of said supply lines with said pressure responsive bypass valves, and (3) opening a bypass valve when the pressure in its supply line exceeds a predetermined pressure due to an obstruction encountered by a mechanism driven by that motor which exceeds said predetermined output torque of its associated hydraulic fluid motor, thereby stopping that motor and its driven mechanism.

6. In a power control system for a machine having a plurality of fluid driven mechanisms driven by a hydraulic motor with the output torque of said mechanisms being directly proportional to the hydraulic pressure supplied thereto, the improvement comprising a pressure responsive control valve in the fluid supply line to said motor, said valve having a closed position at which fluid passes directly to said motor and an open position at which said fluid is bypassed around said motor to stop said motor and the mechanisms driven thereby, said valve having a face exposed to said supply line fluid such that said valve will open when said supply fluid pressure reaches a first predetermined value, and a manual control means for said valve having a first condition which allows said valve to open at said first predetermined pressure and a second condition which will open said valve regardless of said line pressure and a fluid pressure responsive actuator effective to move said manual control means from its said first to its said second condition when said supply line pressure reaches a second predetermined value less than said first predetermined value.

* * * * *